United States Patent Office 3,405,191
Patented Oct. 8, 1968

3,405,191
SELECTIVE POLYMERIZATION OF TERTIARY MONOOLEFINS
Robert L. Banks, Bartlesville, Okla., assignor to Phillips Petroleum Company, a corporation of Delaware
No Drawing. Filed Nov. 18, 1964, Ser. No. 412,230
11 Claims. (Cl. 260—677)

ABSTRACT OF THE DISCLOSURE

A tertiary monoolefin in admixture with an isomeric normal monoolefin is selectively polymerized by contact with a catalyst comprising a silica supported tungsten oxide or tungsten sulfide.

---

This invention relates to the polymerization of tertiary olefins. In one aspect the invention relates to the selective polymerization of isobutene in admixture with n-butene.

In some instances, it is necessary to remove isobutene from a stream comprising n-butene. For example, such a step is required in the manufacture of butadiene by the steps of naphtha cracking and catalytic dehydrogenation. Removal of isobutene from a stream comprising n-butene has been accomplished by a cold acid wash. Such a wash, however, is expensive and inconvenient and the present process provides substantial improvement over that technique. The removal cannot be accomplished by the use of a non-selective polymerization catalyst. For example, silica-alumina or nickel oxide promoted silica-alumina catalysts polymerize both isobutylene and butenes to a substantial degree. Consequently, such catalysts not only are unable to effect the desired separation but in addition cause a loss of n-butene product through polymerization and/or copolymerization.

An object of my invention is to polymerize tertiary olefins. Another object is to selectively polymerize isobutene in admixture with n-butene. Another object is to separate isobutene from a feed stream containing isobutene in admixture with a substantial amount of n-butene. Other objects, aspects and the advantages of the invention are apparent to one skilled in the art upon consideration of the accompanying specification and claims.

According to my invention, a tertiary olefin is polymerized by contact with a silica supported tungsten oxide or tungsten sulfide. Preferably the catalyst contains from about 0.1 to about 20, more especially from about 1 to about 15, weight percent of the tungsten compound. The silica components of the catalyst can be any suitable catalytic grade silica material. Some examples include precipitated silica gel, microspheroidal silica, flame-hydrolyzed silica, silica aerogels, etc. These materials can range from fine powders to coarse granules. The finished catalyst prepared from such silica can also be in the form of powder or granules as well as in other shapes such as agglomerates, pellets, spheres, extrudates, etc., depending upon the type of contacting technique to be used.

The tungsten compound can be incorporated into the silica support by suitable means such as dry mixing, coprecipitation and impregnation. Such catalysts can be activated by exposure to elevated temperatures in the presence of air. An activation for 0.5–20 hours at 800–1400° F. is suitable.

The selective polymerization process is carried out either batch-wise or continuously, using a fixed catalyst bed, stirred batch reactor, or other suitable contacting techniques. The process is carried out either in liquid phase or vapor phase at temperatures from about 150 to about 500° F. However, liquid phase reaction is preferred and pressures which are sufficient to maintain the liquid phase, selected in the range of 0–2000 p.s.i.g. or higher, can be used. In continuous operations, weight hourly space velocities of about 0.1 to about 50 lb. feed/lb. catalyst/hr. are used. In the batch reactions, the catalyst comprises from about 1 to about 40 weight percent of the reaction mixture and reaction time of about 1 minute to about 20 hours are used. If desired, inert paraffinic and cycloparaffinic hydrocarbons having up to about 12 carbon atoms per molecule, can be employed as diluents for the reaction mixture.

My invention is applicable to $C_4$ to $C_{10}$ tertiary mono- and diolefins. By tertiary olefin is meant an olefin which contains the structure

The olefins can be alicyclic, acyclic, aryl-substituted alicyclic or aryl-substituted acyclic. My invention is especially applicable to the group comprising isobutene, 2-methylbutene-1, 2-methylbutene-2, 2-methylpentene-1, 2-methylpentene-2, and 3-methylpentene-2.

Example I

The invention was demonstrated by passing a hydrocarbon mixture containing both isobutene and normal butenes over a bed of 20–40 mesh silica supported tungsten oxide catalyst that contained about 3 weight percent tungsten oxide. The catalyst was activated at 1000° F. for 4 hours in the presence of air. 15.6 parts by weight of this catalyst was charged into a tubular stainless steel reactor. The reactor was equipped with external heating and temperature control means. The feed was passed through the catalyst bed within this reactor for several hours at a pressure of 500 p.s.i.g. and at an 8.1 lb. feed/lb. catalyst/hr. The temperature of conversion as measured by thermocouples within the catalyst bed was maintained in the range of 200–300° F. The effluent gases from the reactor were periodically analyzed and the table below contains the analysis of the feed gas as well as several analyses taken during the course of the run.

| Stream Analysis, weight percent | Feed | After 1 hour and at 228–245° F. | After 4 hours and at 226–244° F. | After 6 hours and at 264–280° F. |
|---|---|---|---|---|
| Propylene | 1.6 | 1.9 | 1.9 | 2.0 |
| Propane | 0.6 | 0.7 | 0.7 | 0.7 |
| Isobutane | 9.2 | 10.8 | 10.6 | 10.6 |
| Isobutylene | 9.0 | 2.9 | 6.1 | 4.7 |
| 1-butene | 44.3 | 34.1 | 36.7 | 34.5 |
| Butadiene | 0.6 | 0.4 | 0.5 | 0.4 |
| n-Butane | 0.1 | 0.1 | 0.1 | 0.1 |
| Trans-2-butene | 33.8 | 39.6 | 38.6 | 39.2 |
| Cis-2-butene | 0.8 | 3.4 | 1.6 | 3.0 |
| $C_5+$ | | 6.1 | 3.2 | 4.8 |
| Conversion, percent: | | | | |
| Isobutylene | | 68 | 32 | 48 |
| n-Butenes | | 2.3 | 2.5 | 2.8 |

As is seen from examination of the table above, a substantial conversion of isobutene to polymerized products occurred while only a negligible amount of the normal butenes were lost. It will be observed that some isomerization occurred between the normal butene materials.

Example II

In another run carried out at essentially the same conditions as those in Example I, the same feed gas was passed over the tungsten oxide catalyst at 500 p.s.i.g., 200–240° F. and 11 lb. feed/lb. catalyst/hr. In a one hour run it was found that isobutene underwent a 48 percent conversion to polymer while the normal butenes had an indicated conversion of −0.4 percent.

Example III

For purposes of comparison, a known isobutene polymerization catalyst, a silica-alumina material containing 88 weight percent silica, was contacted with the same feed as that used in the preceding examples at a pressure of 500 p.s.i.g., an average temperature of 240° F., and at 3.5 lb./feed/lb. catalyst/hr. In a 1 hour test, the analysis of the effluent indicated an isobutene conversion of 98 percent but also indicated a normal butene conversion of 14 percent. Largely similar results were obtained with various silica or silica-alumina catalysts either alone or when promoted by such conventional promoters as $H_2SO_4$, HCl, $H_3PO_4$, NiO and $MoO_3$. Thus, these data indicate that most conventionally known isobutene polymerization catalysts will also convert normal butenes to a substantial degree and are thereby inefective for the separation process of this invention.

Example IV

The invention is further demonstrated by passing a hydrocarbon mixture containing 2-methylbutene-1 and pentene-1 over a bed of 20–40 mesh silica supported tungsten sulfide catalyst that contains about 3 weight percent tungsten sulfide. The catalyst is activated at 1000° F. for 4 hours in the presence of nitrogen. 15 parts by weight of this catalyst are charged into the tubular stainless steel reactor of Example I. The feed is passed through the catalyst bed for several hours at a pressure of 500 p.s.i.g. and a weight hourly space velocity of 8. The temperature of conversion, as measured by thermocouples in the catalyst bed, is maintained in the general range of 200–300° F. The effluent gases from the reactor contain appreciable quantities of polymerized 2-methyl-butene-1 and the pentene-1 is substantially unconverted.

Reasonable variation and modification are possible within the scope of my invention which sets forth a process for the selective polymerization of tertiary olefins.

I claim:

1. A process for the selective polymerization of a tertiary monoolefin in admixture with an isomeric normal monoolefin which comprises contacting a feed containing substantial proportions of said tertiary monoolefin and said isomeric normal monoolefin with a catalyst comprising a promoter selected from the group consisting of tungsten oxide and tungsten sulfide supported on silica under conditions suitable for the polymerization of said tertiary monoolefin.

2. The process of claim 1 wherein said promoter is tungsten oxide.

3. The process of claim 1 wherein said tertiary monoolefin is selected from the group consisting of isobutene, 2-methylbutene-1, 2-methylbutene-2, 2-methylpentene-1, 2-methylpentene-2 and 3-methylpentene-2.

4. The process of claim 3 wherein said promoter is tungsten oxide and said conditions include a temperature in the range of 150 to 500° F.

5. The process of claim 1 wherein said tertiary olefin is isobutene and said conditions include a temperature in the range of 150 to 500° F. and a pressure in the range of 0–2000 p.s.i.g.

6. The process of claim 1 wherein said tertiary olefin is isobutene, and said conditions include a temperature in the range of 150–500° F., a pressure in the range of 0–2000 p.s.i.g. and said promoter is present in an amount in the range of 0.1 to 20 weight percent of the catalyst.

7. The process of claim 6 wherein said promoter is tungsten oxide.

8. A process for the selective polymerization of isobutene in admixing with n-butene which comprises contacting a feed containing substantial proportions of isobutene and n-butene with a catalyst consisting essentially of a promoter selected from the group consisting of tungsten oxide and tungsten sulfide supported on silica under conditions, including conditions of temperature and pressure, suitable for polymerizing isobutene, and separating the reaction mixture into polymer of isobutene and unreacted n-butene.

9. A process for separating isobutene from a feed stream containing isobutene in admixture with a substantial portion of n-butene which comprises the steps of:
contacting said stream with a catalyst comprising from 0.1 to about 20 weight percent of a promoter compound selected from the group consisting of tungsten oxide and tungsten sulfide and the remainder a silica support;
maintaining isobutene polymerization conditions in said zone so as to selectively polymerize isobutene, said conditions including a temperature in the range of 150–500° F.; and
separating the resulting polymer from the reaction effluent to provide an n-butene stream of substantially lower isobutene content than said feed.

10. The process of claim 9 wherein said tungsten compound is present in the range of 1 to about 15 weight percent of the catalyst.

11. The process of claim 9 wherein said promoter is tungsten oxide.

References Cited

UNITED STATES PATENTS

| | | | |
|---|---|---|---|
| 2,224,071 | 12/1940 | Wasserman | 260—683.15 X |
| 2,710,854 | 6/1955 | Seelig | 260—683.15 X |
| 2,982,799 | 5/1961 | Klinkenberg | 260—683.15 |

PAUL M. COUGHLAN, JR., *Primary Examiner.*